US008218734B2

(12) United States Patent
Bhupati

(10) Patent No.: US 8,218,734 B2
(45) Date of Patent: Jul. 10, 2012

(54) MESSAGING WITH A LOCKED COMMUNICATION DEVICE

(75) Inventor: Dhirendra Kumar Bhupati, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 1153 days.

(21) Appl. No.: 11/761,992

(22) Filed: Jun. 12, 2007

(65) Prior Publication Data

US 2008/0310602 A1    Dec. 18, 2008

(51) Int. Cl.
*H04M 1/64* (2006.01)
*G06F 3/048* (2006.01)

(52) U.S. Cl. ............ 379/88.12; 235/382; 340/542; 340/573.1; 345/168; 370/431; 379/39; 379/102.06; 380/247; 399/405; 455/404.2; 455/410; 455/550.1; 455/565; 711/163; 713/320; 715/772; 715/780; 715/863

(58) Field of Classification Search ............... 235/382; 345/168; 379/39, 88.12, 102.06; 380/247; 399/405; 455/404.2, 410, 565, 550.1; 711/163; 715/780, 772, 863; 340/524, 573.1; 370/431; 713/320

See application file for complete search history.

(56) References Cited

U.S. PATENT DOCUMENTS

| 4,686,912 A * | 8/1987 | Fogleman et al. ............ 109/59 T |
| 5,065,309 A | 11/1991 | Putnam ..................... 379/110.01 |
| 5,933,783 A | 8/1999 | Kawakami ..................... 455/566 |
| 6,009,338 A | 12/1999 | Iwata ......................... 455/575.4 |
| 6,252,948 B1 | 6/2001 | Okamoto ..................... 379/93.23 |
| 6,442,251 B1 | 8/2002 | Maes .......................... 379/93.23 |
| 6,504,847 B1 * | 1/2003 | Horlander ..................... 370/431 |
| 6,686,910 B2 | 2/2004 | O'Donnell ..................... 345/179 |
| 6,844,816 B1 * | 1/2005 | Melton et al. .............. 340/572.1 |
| 7,085,382 B2 * | 8/2006 | Terao et al. ................... 380/247 |
| 7,099,699 B2 * | 8/2006 | Jeong ............................ 455/565 |
| 7,120,813 B2 * | 10/2006 | Leydier et al. ................ 713/400 |
| 7,240,228 B2 * | 7/2007 | Bear et al. ..................... 713/320 |
| 7,366,497 B2 * | 4/2008 | Nagata .......................... 455/410 |
| 7,414,613 B2 * | 8/2008 | Simelius ....................... 345/168 |
| 7,480,870 B2 * | 1/2009 | Anzures et al. ............... 715/772 |
| 7,657,849 B2 * | 2/2010 | Chaudhri et al. ............. 715/863 |
| 7,716,596 B2 * | 5/2010 | Cao et al. ...................... 715/780 |
| 7,764,922 B2 * | 7/2010 | Sasama ......................... 399/405 |
| 7,792,544 B2 * | 9/2010 | Vogedes et al. ............ 455/550.1 |
| 7,809,353 B2 * | 10/2010 | Brown et al. ................. 455/410 |
| 2002/0090929 A1 * | 7/2002 | Cho ............................. 455/410 |
| 2002/0173345 A1 | 11/2002 | Swerup ......................... 455/566 |
| 2004/0046017 A1 * | 3/2004 | Sueyoshi et al. ............. 235/382 |

(Continued)

OTHER PUBLICATIONS

Narayanaswamy, S., et al.; "*User Interface for a PCS Smart Phone*"; Jul. 1999; Multimedia Computing and Systems, 1999; IEEE International Conference Jul. 1999; 5 pgs.

(Continued)

*Primary Examiner* — Gerald Gauthier

(74) *Attorney, Agent, or Firm* — Merchant & Gould

(57) ABSTRACT

A communication device supports leaving a message using a communication device input interface when the device is in a locked state. The communication device may be a network telephone having a display interface and a user input interface. The communication device may be configured to transition to a locked state, store a message based on input received at the locked communication device, and present the message to an intended recipient. The message may be presented to the intended recipient upon unlocking the device (e.g., stored locally and presented when the phone is unlocked), presented to the intended recipient in accordance with communication settings (e.g., delivered to an email account, cell phone, etc.), or otherwise delivered.

20 Claims, 5 Drawing Sheets

U.S. PATENT DOCUMENTS

| | | | | |
|---|---|---|---|---|
| 2006/0088143 | A1 | 4/2006 | Tapaninen | 379/88.11 |
| 2006/0239248 | A1 | 10/2006 | Hawk | 370/352 |
| 2007/0071180 | A1* | 3/2007 | Kanada | 379/39 |
| 2008/0162848 | A1* | 7/2008 | Broyles et al. | 711/163 |
| 2008/0200142 | A1* | 8/2008 | Abdel-Kader et al. | 455/404.2 |
| 2008/0310602 | A1* | 12/2008 | Bhupati | 379/88.12 |

OTHER PUBLICATIONS

About.com; "*Build your personalized Mobile Notepad*"; accessed on Apr. 23, 2007 at http://cellphones.about.com/od/software/l/bl_mobile_notep.htrn; 1 pg.

\* cited by examiner

MESSAGING WITH A LOCKED COMMUNICATION DEVICE

BACKGROUND

It is common to visit a person's office and find that person is not present. In such circumstances, it is common to leave the person a message which may be written on a piece of paper with a writing instrument. These items may not be immediately available to a visitor, particularly in a paperless office. Additionally, if the message is of a private or confidential nature, leaving a paper message may fail to provide adequate information assurance as any subsequent visitor may be able to see the message. If the message is time sensitive, a paper message may not be received by the recipient in a timely manner.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A communication device supports leaving a message for a person when the communication device is in a locked state (e.g., when the person is out of the office). The communication device may be a network telephone (e.g., a session initiation protocol (SIP) based Internet protocol (IP) telephone) or any other appropriate communication device having a user input interface and a display or other type of output interface.

The communication device may transition to a locked state, receive input through the user input interface, and store that input as a message. The message may be presented to the intended recipient at any appropriate time such as when the communication device is unlocked, in accordance with communication settings (e.g., delivered to an email account, cell phone, instant messenger client, etc.), and/or otherwise delivered in a manner that enhances information assurance, timeliness, and/or other benefits.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a communication device, such as a telephone, the system described is provided as an example and not a limitation. As those skilled in the art will appreciate, the present examples are suitable for application in a variety of different types of devices, including a computing system (e.g., a desktop or laptop personal computer) or any other communication device.

Figure 1:
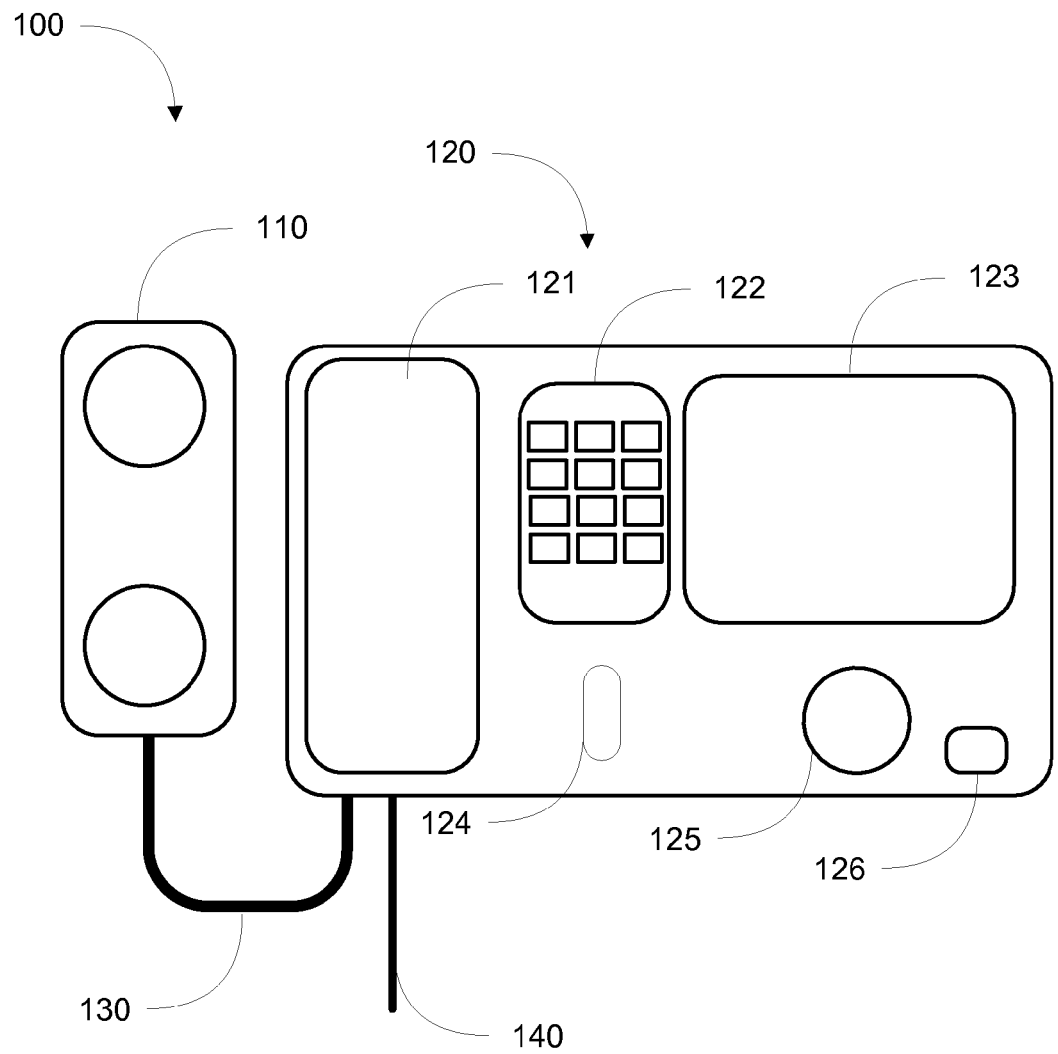
FIG. 1 is an exemplary embodiment of a communication device.

FIG. 1 is an exemplary embodiment of a communication device 100. The communication device 100 may include a base unit 120, a handset 110, a handset chord 130 or other connection means (e.g., wired or wireless) that connects the handset 110 to the base unit 120, and a network cable 140 or other connection means (e.g., wired or wireless) that connects the communication device 100 to a network. Base unit 120 includes a handset cradle 121 configured to receive the handset 110. The base unit 120 also may include one or more input interfaces, including keypad 122, fingerprint reader 124, and/or wheel scroll 125. Additionally, the base unit 120 may include one or more output interfaces, such as display output interfaces including light emitting diode (LED) status indicator 126 and/or liquid crystal display (LCD) touch screen 123, and/or other types of output interfaces (e.g., a speaker, etc.). The user input interface and the display interface may be separate, integrated, or a combination. For example, one input interface may include a touch screen which may be integrated with a liquid crystal display interface. Communication device 100 may include more or fewer input and/or display interfaces.

Figure 2:
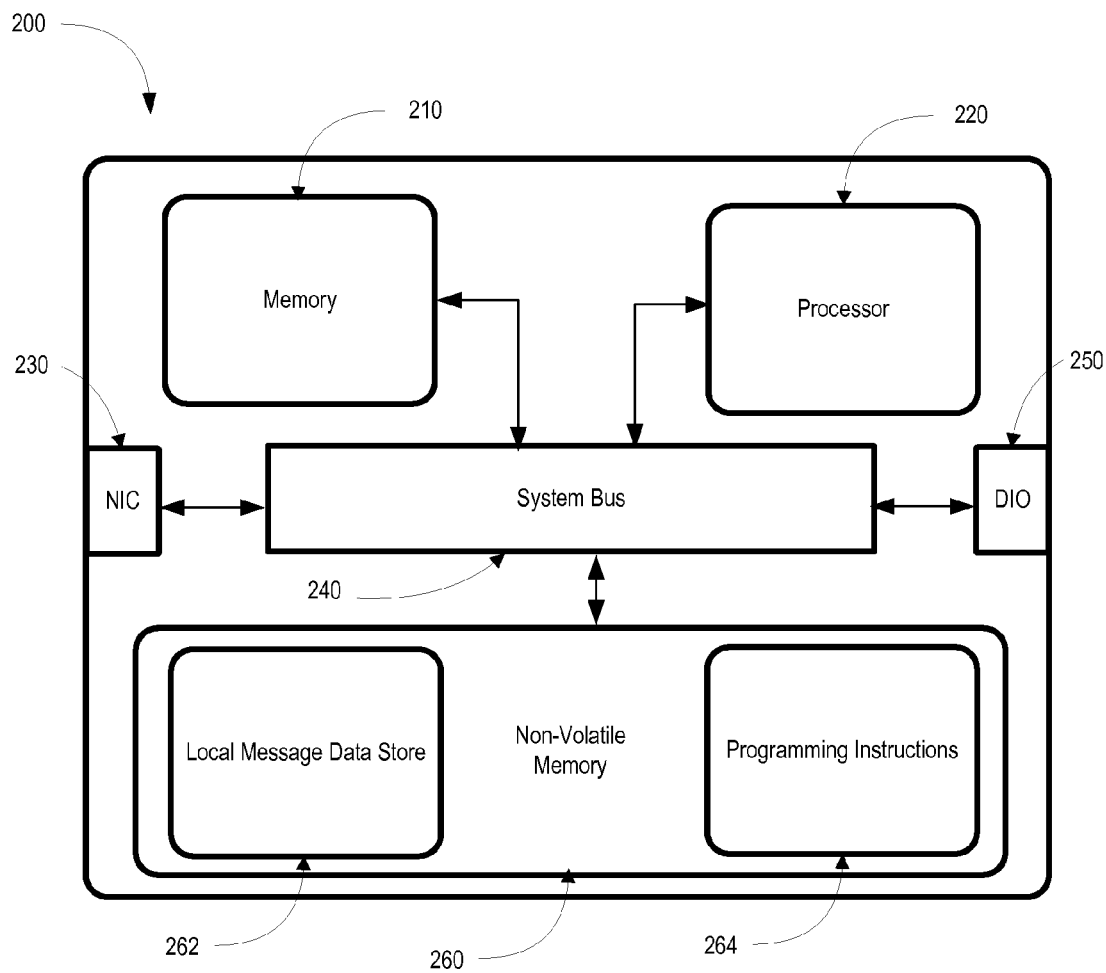
FIG. 2 is a logical diagram of the components of an exemplary device.

The exemplary embodiment described in FIG. 1 may include a variety of internal components. FIG. 2 provides one example of a logical diagram of the components that may be included with communication device 100. These components may work together to provide various functionality, such as the functionality described with respect to FIGS. 3A, 3B, and 4. It is understood that more or fewer components may be used, and that communication devices and functionality other than the specifically described examples may be implemented using the components depicted in FIG. 2. In one embodiment, the device 200 may include a memory device 210, such as random access memory and/or non-volatile memory; a processor 220, such as a microprocessor; a network interface 230, such as a network interface card; and one or more device input and/or output interfaces. Additionally, device 200 may include system bus 240 that interconnects the components. The network interface may enable communication with a remote device having a remote input interface and a remote output interface. The memory 210 may contain device readable data including a local message data store 262 and programming instructions 264.

Memory 210 and non-volatile memory 260 are examples of device readable storage media. By way of example, and not limitation, device readable storage media may include volatile and non-volatile, removable and non-removable media implemented in any method or technology for storage of information such as device readable instructions, device executable instructions, data structures, program modules, or other data. Device readable storage media includes, but is not limited to, RAM, ROM, EEPROM, flash memory, or other memory technology. When the device is a computing device or other suitable device, device storage media may include computer readable media such as CD-ROM, digital versatile disks (DVD) or other optical storage devices, or any other medium which can be used to store the desired information and which can be accessed by the computing device.

Figure 3A:
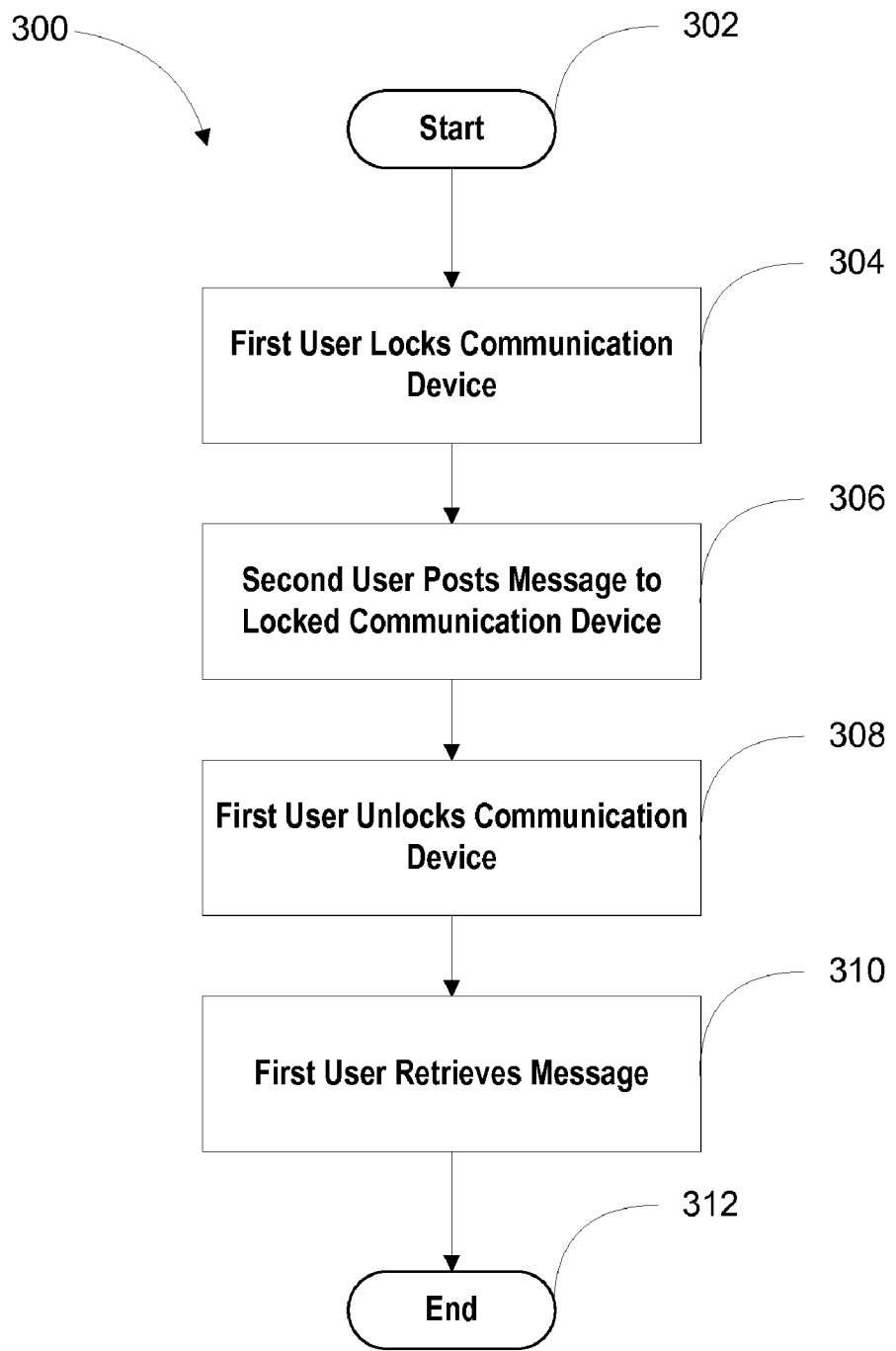
FIG. 3A is a flow chart depicting a scenario in which the communication device is used to deliver a message.

FIG. 3A is a flow chart 300 depicting a scenario in which a communication device is used to receive and deliver a message. A first user locks the communication device 100 at 304. This process may be analogous to the locking of a personal computer, in which a combination of keys and/or interaction with a graphical user interface enables a user to lock a device from users without authorization, e.g., through a password, fingerprint, and/or other security measure. Additionally or alternatively, the communication device 100 may be locked based on the occurrence of some other event (e.g., the passage of a predetermined amount of time without user interaction, the first user locking a personal computer associated with the communication device, etc.). For example, the user may lock the communication device 100 because the user will be attending a meeting, for example, and does not want to allow personal information (e.g., contact lists and call logs) to be accessible via communication device 100.

A second user, hoping to talk with the first user, may visit the first user's office and discover that the first user is out of the office (and the communication device 100 is locked from general use by the second user). The second user may leave 306 a message for the first user. For example, with reference to the communication device 100 of FIG. 1, the second user may initiate and enter a message using the user input interface of the communication device.

In some cases message initiation may be a separate action from message entry. For example, the second user engage a message control (e.g., push a button or combination of buttons on the keypad 122, touch the LCD touch screen 123, push a dedicated message button (not shown), or other input device) to initiate a message entry interface or mode. Alternatively, a default behavior for a communication device 100 of FIG. 1 may be message creation, in which case the communication device 100 treats received input as message information unless an alternate operation is identified, such as unlocking the communication device by selecting an unlock option through the user input interface, e.g., by selecting an unlock button. A hybrid approach may be used, in which input provided to a first user input interface is message input by default and input from a second user input interface is another default action. For example, the LCD touch screen 123 may be message input by default, and input information provided to the fingerprint reader 124 and/or keypad 122 may be unlock input by default.

The message may be entered using any appropriate user input interface. With reference to the communication device of FIG. 1, the second user may enter a message using the keypad 122 (e.g., as used in text messaging with cellular phones), using a keyboard on the LCD touch screen 123, hand-writing a note on the LCD touch screen, a combination thereof, or other input modality (e.g., by leaving a verbal message by either using the handset 120 or a microphone).

If the second user attempted to perform certain other operations (e.g., operations available when the communication device 100 is in an unlocked state and not in a locked state), the attempted operations would be disallowed. Operations available when the communication device 100 is in an unlocked state and not in a locked state may be referred to as access-controlled operations. As described with respect to FIG. 4 below, access-controlled operations may include access to a contact list, access to call logs, access to voice mails and other messages, and/or access to or manipulation of other personal information. Accordingly, if the second user attempted to perform an access-controlled operation (e.g., lookup a contact) communication device 100 may disallow this operation while the phone is in a locked state. The locked state may be referred to as a partially locked state, and both of these terms refer to a state in which a user has logged in (or otherwise associated the device with the user) and then performed a lock operation on the communication device 100, and the communication device 100 has a limited subset of available operations (e.g., leave a message, unlock, answer a call, and place a call).

The first user may retrieve 310 the stored messages. For example, the stored messages may be presented to the user on a display device of the communication device such as the LCD touch screen 123 of FIG. 1; may be forwarded to another communication device based on predefined or default user preferences, etc. For example, if the message is stored at the communication device for retrieval, such retrieval may only be allowed after the device is unlocked. Thus, upon returning to the office, the first user may see that a message has been left (e.g., LED status indicator 126 of FIG. 1 may be lit). The first user may then unlock the communication device. This may be done by, for example, swiping a finger across the fingerprint reader 124 of FIG. 1, entering a personal identification number using keypad 122 or LCD touch screen 123 of FIG. 1, speaking into a voice recognition device (e.g., handset 130), authenticating into/unlocking a computer, or performing other unlock operation.

It is understood that FIG. 3A represents an exemplary scenario in which the communication device is used to receive and present a message. Other steps may occur in addition to the depicted steps of FIG. 3A. For example, an alternate scenario may exist in which a third user visits the office and provides another message, attempts to access the previously stored message and is disallowed, etc. Given the processes described with respect to FIGS. 3B and 4, those skilled in the art will appreciate how the present communication device may perform in such scenarios.

Figure 3B:
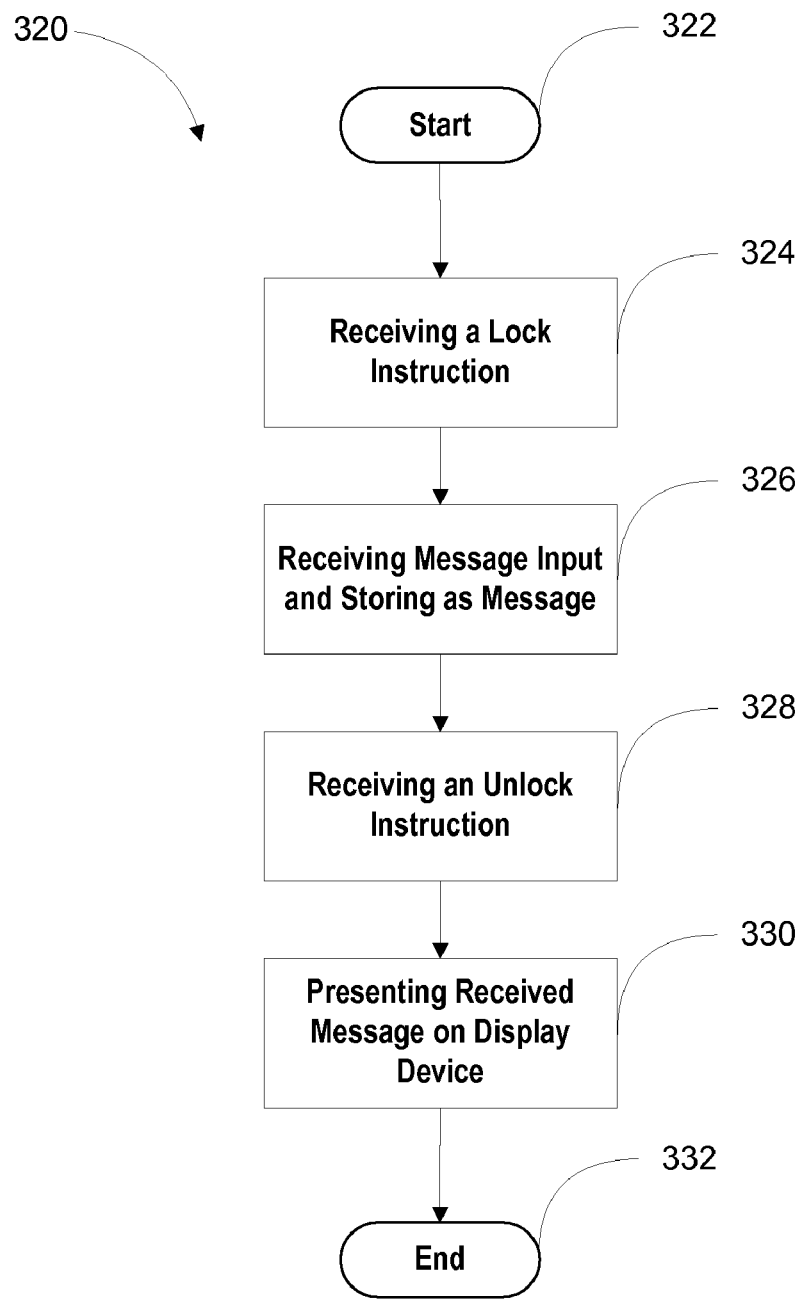
FIG. 3B is a flow chart depicting an example operation of the communication device in response to received input.

Transitioning from the exemplary scenario of FIG. 3A that describes users interacting with a communication device, FIG. 3B depicts the user input received by and presented from the communication device. Accordingly, FIG. 3B may be viewed as a device-centric flow chart corresponding to the user-centric scenario depicted in FIG. 3A.

The communication device may receive a lock instruction at 324. Message input may be received at the locked communication device at 326. Although it may not be relevant which of the communication device input interfaces (e.g., keypad, LCD touch screen, handset, a combination thereof, microphone, etc.) is used to provide the input, it is relevant that the input is received at one of the local input interfaces of the communication device (e.g., one physically connected to or otherwise integrated with the input interface). More specifically, message input and user input for the purposes of this application do not include information received via a network interface or other remote device interface, such as a phone call or other message from a remote communication device, a wireless transmission from another communication device, etc.

The message created based on the received message input may be stored locally, transferred to a communication server or service (e.g., an email server, an instant messaging service, a unified communication server, etc.), transferred to a remote device such as a cell phone, or otherwise managed. When the message input is handwritten input, this handwritten message input may be stored as an image. Additionally or alternatively, the handwritten message may be converted to textual data such as by using optical character recognition. This translation to text may occur at the device locally, transmitted to a remote device for translation, or translated via other means. In addition to non-verbal message input, the communication device may receive verbal message input (e.g., speaking a message into the handset or into a microphone). This verbal message input may be stored as the message and/or translated to text such as using a speech-to-text converter. This conversion may occur at the communication device 100 or at a remote device.

The presence and/or absence of a message may be indicated by an output device or interface of the communication device (e.g., by the presence, absence, and/or characteristics of a light, by an icon, by a sound, by vibration of the device, etc.). For example, the LED status indicator 126 may be turned on and off to display the presence or absence of a message (e.g., may be turned on when a message is present and turned off when no message is present). This information may be available when the communication device is in either a locked state or an unlocked state. Similarly, the LED status indicator or other type of display may indicate a number of messages that have been received.

Unlock instructions may be received by the locked communication device 100 at 328, at which point the communication device may transition from a locked state to an unlocked state. When the communication device is in an unlocked state, the received message may be presented 330, for example, by displaying the message on an output interface, such as LCD touch screen 123.

Although the device has been described as a communication device 100 and, more particularly, a telephone device, it is understood that the device may be any device that may be modified, built, or programmed to implement the described functionality.

Figure 4:
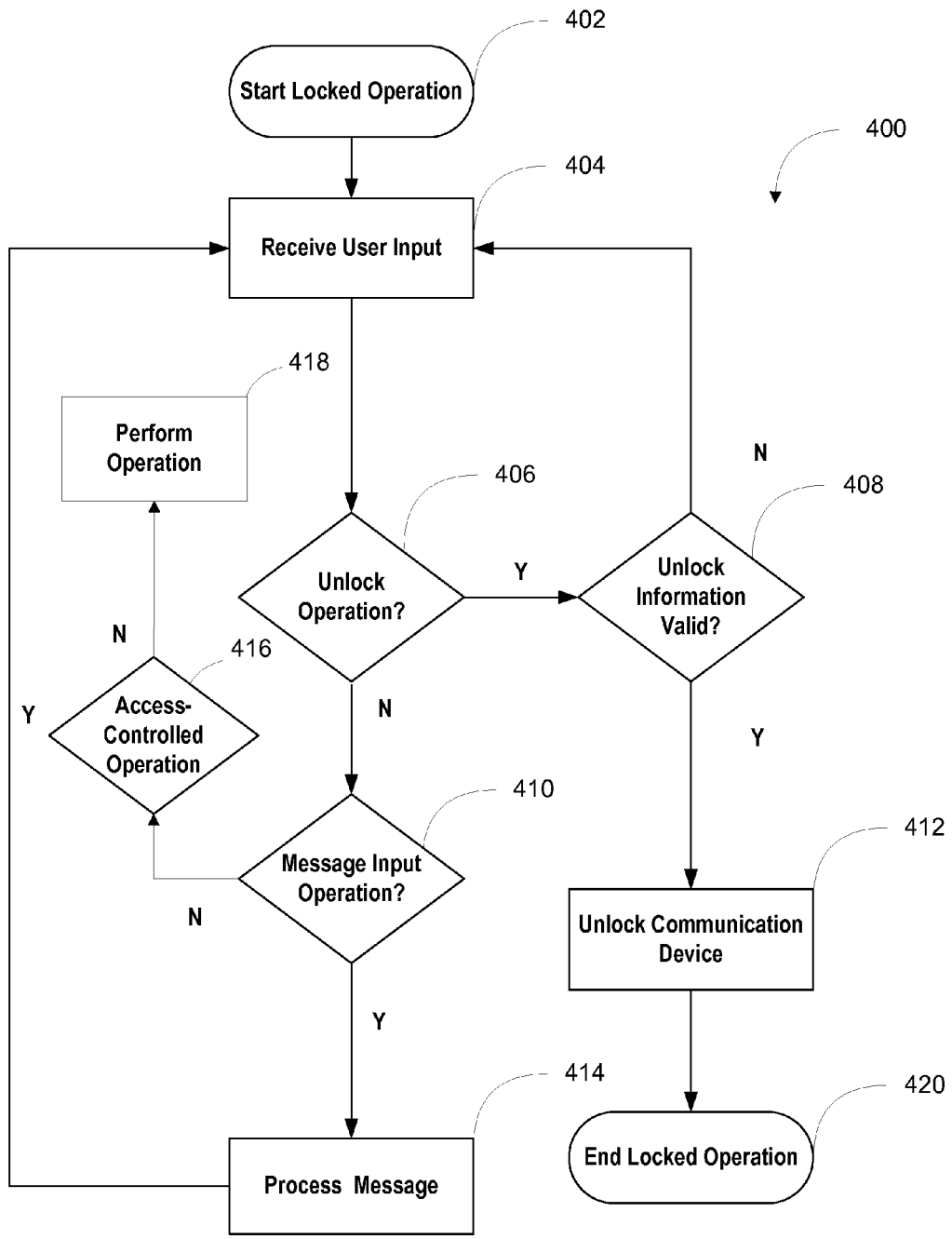
FIG. 4 is a flow chart depicting an example operation of the communication device while in a locked state.

FIG. 4 is a flow chart depicting operation of the communication device while in a locked state. This process 400 may be encoded as a set of executable instructions stored on a device-readable storage medium. At 404, user input is received. At 406, it is determined whether the received user input relates to an unlock operation. In one embodiment, when input is received from a particular local input device, the communication device 100 may assume that an unlock operation is being attempted. For example, information received from the fingerprint reader 124 may be handled in accordance with an unlock operation attempt. Additionally, a user may select an operation (e.g., by clicking a button on keypad 122 or LCD touch screen 123) that initiates an unlock or message operation. If the received user input relates to an unlock operation received at an input interface of the communication device (yes at 406), it may be determined whether the unlock information is valid at 408. For example, if user authorization is required to unlock the communication device, the communication device may compare received unlock information either from unlock initiation (e.g., fingerprint swipe) or provided in response to a prompt. Specifically, the communication device 100 may determine whether a swiped fingerprint corresponds to a user account that is associated with the locked communication device (e.g., a user account that was logged in when the device was locked). If the unlock operation is not valid (no at 408), the communication device 100 awaits further user input. It may also present information (such as "unlock operation failed" on an output interface) to notify a user of the result of the attempted unlock. If the unlock information is valid (yes at 408), the communication device 100 is unlocked 412 and the locked operation ends 420. User input and other information relating to successful and/or unsuccessful unlock attempts may be stored in a security or other type of log.

If the received user input is determined not to relate to an unlock operation (no at 406), the communication device may determine whether the received user input relates to a message input operation 410. When the received user input does not correspond to a message input operation (no at 410), this means that the user input does not relate to either an unlock operation or a message input operation.

In one embodiment, a further determination of whether the user input corresponds to an access-controlled operation may be made at 416. If the user input corresponds to an access-controlled operation (yes at 416), the operation may be disallowed because: 1) the phone is in a locked state; and 2) the phone disallows local user input initiated access-controlled operations while in a locked state. Access controlled operations may include access to personal information relating to the logged in user (e.g., contact lists, call logs, etc.). Local user input initiated operations may be operations initiated based on user input received at the communication device 100 (e.g., LCD touch screen 123, keypad 122, fingerprint reader 124, wheel scroll 125, etc). They may be distinguished from other types of operations, including network or remote operations (operations initiated based on information received from a network and/or remote communication device) and miscellaneous operations (including a power-off operation resulting from loss of device power).

If the user input does not correspond to an access-controlled operation (no at 416), the communication device may perform the operation corresponding to the user input 418 and then await further user input. Answering a phone call and placing a phone call may be allowed operations even while the phone is in a locked state. In an alternate embodiment, operations other than unlock and message input may be disallowed while the phone is in a locked state (e.g., all other user input initiated operations are access-controlled operations, including answering a phone call and placing a phone call). In such an embodiment, steps 416 and 418 may be removed from the method. In yet another embodiment, any operation that relates to an identity of a logged in user may be access-controlled, and any operation that does not relate to the identity of a logged in user may be available even when the phone is locked. For example, a global address book may be available while the communication device is in a locked state, while a personal address book is not. In another embodiment, access-controlled operations may be determined by an authorized user (e.g., a communication device user and/or administrator, etc.). Other groupings and/or methodologies may be used to distinguish between access-controlled operations and operations that are allowed while the device is in a locked state.

When the received user input comprises message input information (yes at 410), the user input may be processed as a message 414. For example, the message may be stored locally, transmitted to a user in accordance with the user's communication settings (e.g., forwarded to the user's mobile communication device for presentation on a remote display interface, emailed to the user, transmitted to another user, etc.). The communication settings may be managed and stored at the communication device, at a remote communication device (such as an email server), a combination thereof, or otherwise managed and stored. Upon processing the message, the communication device 100 awaits further user input.

It is understood that the message may not include some of the received user input (e.g., if the user input included user input identifying the type of operation that was being requested, this may not be stored as part of the message), and additional information may be appended (e.g., a date/time that the message was created may be stored as part of the message), but the primary content of the stored message is the user input provided by the user (and/or a translation of the user input if an optical character recognition or voice-to-text translation is applied). For example, if a user initiates an unlock operation and provides a set of user input, the resultant message (e.g., an entry in a security log) would be different than if the user initiates a message input operation and provides the same set of user input. Furthermore, there is no attempt to unlock the communication device 100 when a message input operation is initiated.

Those skilled in the art will recognize that storage devices utilized to store device instructions can be distributed across a network. For example, a remote device may store an example of the process described as software. A local or terminal device may access the remote device and download a part or all of the software to run the program. Alternatively, the local device may download pieces of the software as needed, or execute some software instructions at the local terminal and some at the remote device (or device network). Those skilled in the art will also realize that by utilizing conventional techniques known to those skilled in the art that all, or a portion of the software instructions may be carried out by a dedicated circuit, such as a DSP, programmable logic array, or the like. Similarly, it is understood that by utilizing conventional techniques known to those skilled in the art that the communication device may be a computing device and the device readable storage medium may be computer readable storage medium.

The invention claimed is:

1. A communication device comprising:
 a user input interface;
 a display interface; and
 a device-readable storage medium encoding a set of device-executable instructions for performing a process comprising:
  transitioning the communication device to a locked state;
  receiving user input at the user input interface;
  determining whether the received input is message input that is directed at a user of the communication device; and
  when the received input is message input, storing a message based on the received message input.

2. The communication device of claim 1, wherein the device readable storage medium includes additional device-executable instructions for performing:
 indicating the presence of a message.

3. The communication device of claim 1, wherein the device readable storage medium includes additional device-executable instructions for performing:
 transitioning the communication device to an unlocked state; and
 presenting the stored message on the display interface.

4. The communication device of claim 1, wherein the device readable storage medium includes additional device-executable instructions for performing:
 storing the message locally on the communication device.

5. The communication device of claim 1, wherein the device readable storage medium includes additional device-executable instructions for performing:
 transmitting the stored message to a remote communication device.

6. The communication device of claim 1, wherein the communication device comprises a computing device and the device readable storage medium encoding a set of device-executable instructions comprises a computer readable storage medium encoding a set of computer-executable instructions.

7. The communication device of claim 1, wherein the communication device comprises an Internet protocol telephone.

8. The communication device of claim 1, wherein the device readable storage medium includes additional device-executable instructions for performing:
 disallowing an access-controlled operation while the device is in a locked state.

9. The communication device of claim 1, wherein the locked state is a state in which the communication device has a set of available operations consisting of an unlock operation, a message creation operation, an answer phone operation, and a place phone call operation.

10. The communication device of claim 1, wherein the locked state is a state in which an access contact list operation and an access call log operation are disallowed.

11. A method comprising:
 receiving a lock instruction at a communication device;
 receiving message input entered into a user interface located on the locked communication device;
 storing the received message input as a message that is directed at a user of the communication device;
 receiving an unlock instruction at the communication device; and
 presenting the message on an output interface of the communication device.

12. The method of claim 11, further comprising:
 disallowing an access-controlled operation on the locked communication device, wherein the access-controlled operation is allowable when the communication device is in an unlocked state.

13. The method of claim 11, wherein the communication device comprises an Internet protocol telephone.

14. The method of claim 11, further comprising:
 wherein the output interface is a remote output interface.

15. The method of claim 11, further comprising:
 adjusting an output device to indicate the presence of a message.

16. A device-readable storage medium encoding a set of device-executable instructions for performing a process comprising:
 receiving user input at a locked communication device;
 determining whether the received user input relates to an unlock operation;
 when the received user input relates to an unlock operation, determining whether the received user input includes valid unlock information;
 when the received user input includes valid unlock information, unlocking the communication device;
 when the received user input does not relate to an unlock operation, determining whether the received user input relates to a message input operation; and
 when the received user input relates to a message input operation, storing a message that is directed to a user of the communication device based on the received user input.

17. The device-readable storage medium of claim 16, the process further comprising:
 when the received user input relates to an access-controlled operation, disallowing an operation indicated by the received user input.

18. The device-readable storage medium of claim 16, the process further comprising:

when the received user input relates to accessing personal information, disallowing the operation indicated by the received user input.

19. The device-readable storage medium of claim 16, the process further comprising:

when the received user input relates to at least one member of a group of operations, the group comprising accessing a contact list and accessing a call log, disallowing the operation requested by the received user input.

20. The device-readable storage medium of claim 16, the process further comprising:

when the received user input relates to a message input operation, forwarding the message to a remote device.

* * * * *